Jan. 12, 1954 M. M. CARPENTER, JR 2,666,136

FREQUENCY SYNCHRONIZING APPARATUS

Filed Oct. 31, 1950 2 Sheets-Sheet 1

INVENTOR
MARSHALL M. CARPENTER, JR.
BY
ATTORNEY

Jan. 12, 1954 M. M. CARPENTER, JR 2,666,136

FREQUENCY SYNCHRONIZING APPARATUS

Filed Oct. 31, 1950 2 Sheets-Sheet 2

INVENTOR
MARSHALL M. CARPENTER, JR.
ATTORNEY

Patented Jan. 12, 1954

2,666,136

UNITED STATES PATENT OFFICE 2,666,136

FREQUENCY SYNCHRONIZING APPARATUS

Marshall M. Carpenter, Jr., Princeton, N. J., assignor to Radio Corporation of America, a corporation of Delaware Application October 31, 1950, Serial No. 193,182

4 Claims. (Cl. 250—27)

This invention relates to apparatus for deriving signals for synchronizing a local oscillator with a burst of alternating current energy.

In particular, this invention relates to apparatus for deriving a frequency or phase control signal from a burst of control frequency transmitted in a color television system of the type wherein the color information is multiplexed at an elemental rate.

In a dot multiplex color television system successive elements of the scanned line of the raster are represented in accordance with an intensity of a different component color. The first element might correspond to the red intensity of that point of the image, a second element might correspond to green, and a third element might correspond to blue. This sequence may then be repeated during the rest of the line. In some forms of such a system the second scanning of the same line position is done in such manner that the information as to the red, green and blue content of the image is doubly interlaced, which means that it is shifted along the line with respect to the line by 180 degrees. This means that a red element will now appear half way between the red elements produced when the line was scanned initially.

It is apparent that some means must be provided for synchronizing the color reproducing apparatus at the receiver with the transmitted signals, so that the colors reproduced at the receiver will correspond to the signals transmitted. In other words, if the elemental information being received at a particular time is indicative of the intensity of the red component in the image at a particular point, the reproducing mechanism in the receiver must be operated so as to reproduce red at a corresponding point in the reproduced image.

Heretofore, a free-running sampling oscillator has been employed to key the color reproducing means in the receiver at the appropriate intervals. The frequency of this oscillator has been controlled by comparing its output with a burst of alternating current energy occurring immediately after the horizonal sync pulses. This burst of energy has the same phase and frequency as the change in color information conveyed by the transmitter. In order that the sampling oscillator be controlled by the burst and not by any other energy occurring at the transmitted wave, it is apparent that means must be provided for separating the burst from the rest of the transmitted information. As the frequency of the burst is precisely established, it can be selected by appropriate filters. Generally, the burst is superimposed upon the blanking pulse so that it occurs at the blacker than black region. Accordingly, amplitude selection can also be employed. Perhaps the most reliable way of separating this burst, however, is to apply it to a gating circuit that is adapted to pass signals applied to it only during the time that the burst is present. After the burst of synchronizing energy has been separated by one or more combinations of the above methods, it has been customary to apply it to a phase discriminator to which the output of the sampling oscillator is also supplied. The direct current control voltage developed by the phase discriminator is then applied to a reactance tube that is associated with the sampling oscillator in such a way as to control its frequency.

In accordance with this invention, however, the function of separating the burst from the rest of the transmitted train of signals and of deriving a direct current voltage that is dependent upon the phase relationship between this burst of energy and the output of the sampling oscillator is accomplished by a single circuit in a very simple manner.

It is, therefore, an object of this invention to provide an improved and simplified means for deriving a frequency control voltage in response to the phase relationship between a burst of alternating current energy appearing during predetermined intervals in the transmitted wave and the output of the sampling oscillator that is used to control the multiplexing at a color television receiver.

Briefly, this objective may be obtained by combining a known phase discriminator with apparatus for rendering said phase discriminator operative during the time when a burst of synchronizing alternating current energy is being received.

The manner in which the above objective may be achieved and the advantages of this invention realized will become more apparent from a detailed consideration of the drawings in which.

Figures 1, 2:
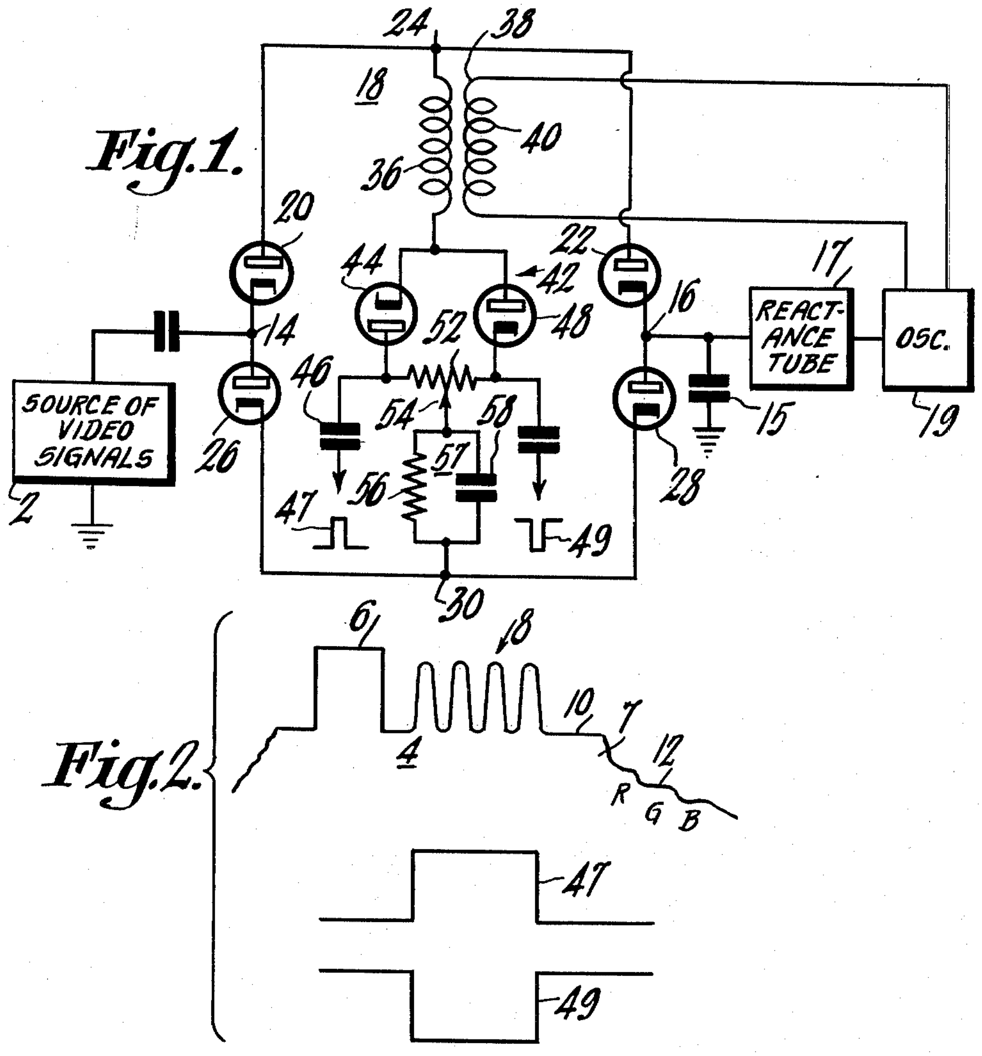
Figure 1 illustrates one way of applying the principles of this invention to a phase discriminator employing unilateral conducting devices in a bridge network.
Figure 2 illustrates voltage waves that will help in the explanation of the circuit shown in Figure 1.
Figure 3:
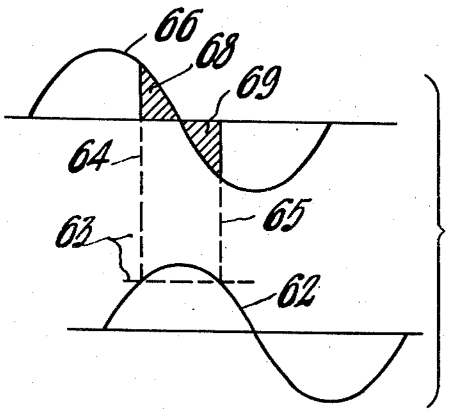

Figure 3 also illustrates voltage waves helpful in the explanation of the operation of the circuit shown in Figure 1.

Figure 4:
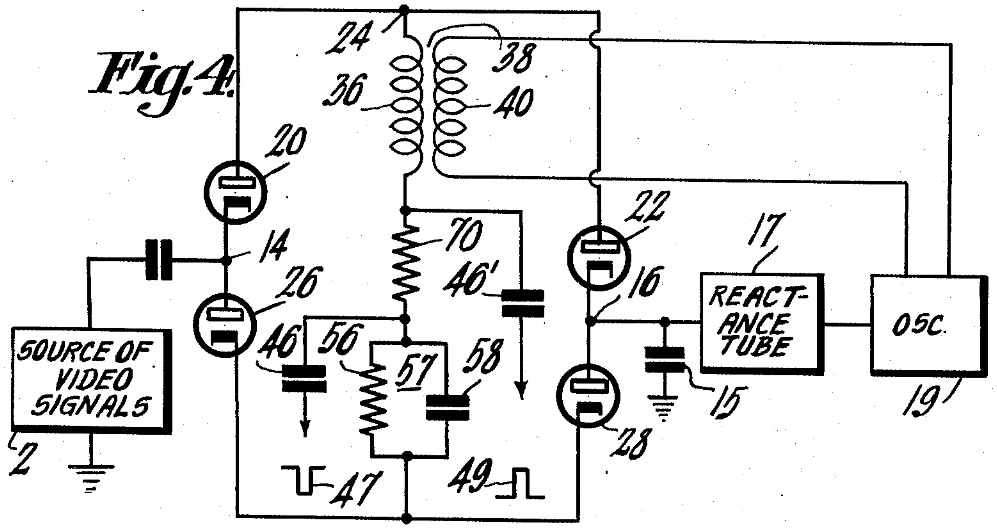
Figure 5:
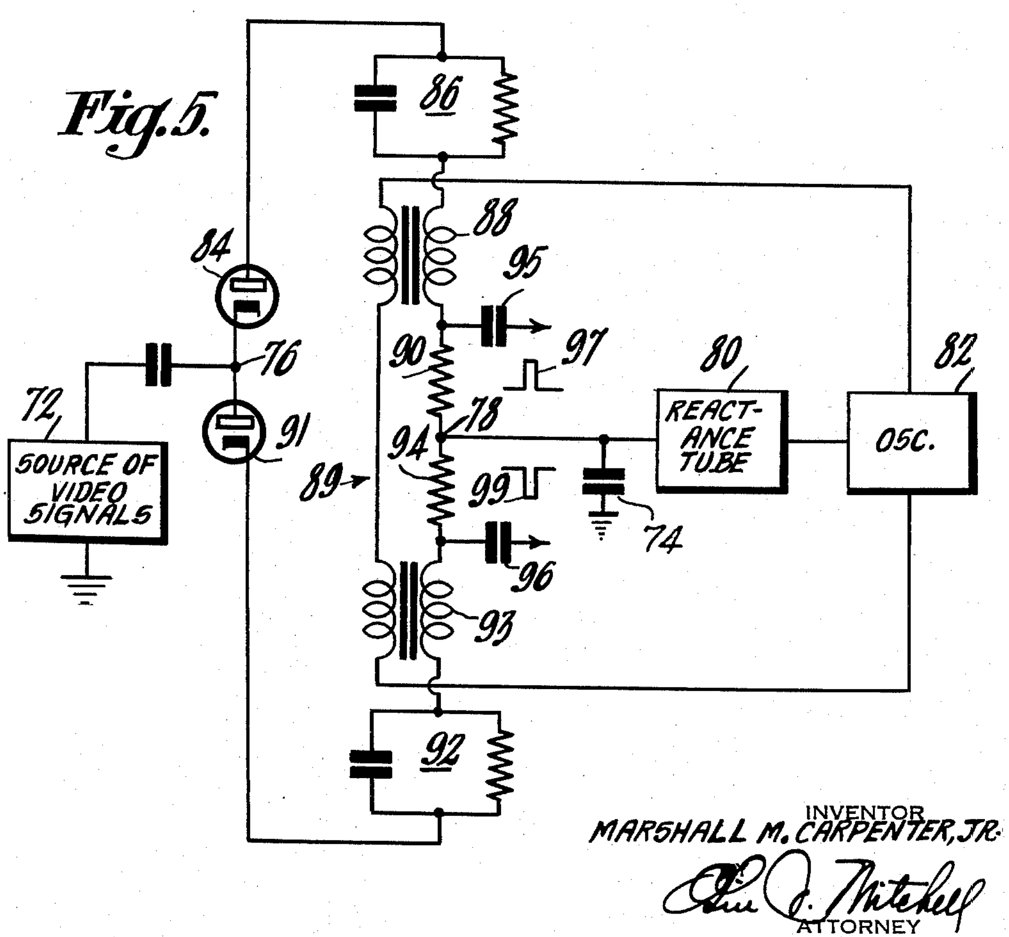

The circuit arrangement of Figure 4 illustrates another way of applying the keying potentials to a phase discriminator of the type shown in Figure 1, and Figure 5 illustrates a method of applying this invention to a phase discriminator that operates in a manner similar to Figure 1 which employes fewer unilateral devices.

Turning now to Figure 1, there is shown a source 2 of video waves such as illustrated in waveform 4 of Figure 2. The pulse 6 of Figure 2 is the well known horizontal synchronizing pulse and the burst of alternating current energy 8 occurs immediately following the pulse 6 at a portion of the video signal train known as the back porch. The top of the blanking pulse 7 is indicated by the numeral 10 and a portion of one line of video signals is indicated by the numeral 12. As previously stated, the amplitude of the transmitted voltage during the time 12 successively represents each of the plurality of component colors employed in the color television system. For example, during the interval R the intensity of the red component occurring at that point in the image is transmitted. During a succeeding interval G the green information at that point in the image is transmitted, and during a third portion B the information as to the intensity of the blue at that point in the image is transmitted. Such a signal may be derived from the second detector or at the output of the video amplifiers of a standard monochrome receiver such as are now available.

The video signals supplied by the source 2 are coupled into series relationship with a storage condenser 15 across which the control voltage is to be developed. This control voltage is applied to control a reactance tube 17 which in turn controls the frequency of a sampling oscillator 19 in a manner well known to those skilled in the art. This series circuit is connected between a terminal 14 and a terminal 16 of a rectifier bridge network 18. A similar bridge network is described in the United States Patent 2,250,284 issued in July 1941 to Wendt. For the sake of convenience, however, this bridge network 18 will now be described in detail. The upper arms of the bridge are comprised of unilaterally conducting devices such as diodes 20 and 22 connected in series opposition and having their cathodes connected to the terminals 14 and 16 respectively. Their plates are tied to another terminal of the bridge indicated by the numeral 24. The lower two arms of the bridge network 18 are comprised of unilateral conducting devices such as the diodes 26 and 28 that are connected in series opposition between the terminals 14 and 16 respectively. The cathodes are connected to a terminal indicated by the numeral 30.

Between terminals 24 and 30, or in other words across one of the diagonals of the bridge network 18, the following apparatus is connected in series. First of all there is a secondary 36 of the transformer 38 having a primary 40 coupled to the output of the sampling oscillator 19. In series with the secondary 36 there is connected an electronic switch 42 which may take any desirable form.

This particular form of electronic switch operates in the similar manner to the keyed clamp circuits such as described in United States Patent 2,299,945 to Karl Wendt. It is comprised of a first diode or other unilateral current conducting device 44 having its cathode connected to the lower end of the secondary 36 and its plate coupled via a blocking condenser 46 to a means for providing positive pulses 47 during the burst interval. A second unilateral conducting device, which may be a diode 48, has its plate connected to the bottom of the secondary 36 and its cathode coupled to means for providing a negative pulse 49 during the burst interval. Between the plate of the diode 44 and the cathode of the diode 48 is connected a potentiometer comprised of a resistor 52 and a movable arm 54. Between the movable arm 54 and the terminal 40 of the bridge network 18, there is connected an energy storage means 57 which may be comprised of a resistor 56 connected in parallel with a condenser 58. The particular order in which the secondary 38, the electron switch 42, and the energy storage circuit 57 are connected is not of importance to the practice of this invention.

The overall operation of the apparatus just described in connection with Figures 1, 2 and 3 will now be explained. It is well understood by those skilled in the art that voltages appearing across one diagonal of a balanced bridge network such as 18 of Figure 1 do not appear across the opposite diagonal and vice versa. Therefore, in the arrangement shown, the voltages appearing between the terminals 24 and 30 do not appear at the terminals 14 and 16 and, therefore, do not effect in and of themselves the charge appearing across the storage condenser 15. However, the voltage appearing at the terminal 14 will appear at the terminal 16 and thus across the storage condenser 15, when the diodes are conducting.

However, in order for a voltage applied at the terminal 14 to reach the terminal 16, the diodes 20, 22, 26 and 28 must be in a conducting condition. The conductivity of the diodes is controlled by the voltages appearing in the series circuit connected between the terminals 24 and 30. Upon application of the positive pulse 47 and the negative pulse 49 to the electronic switch 42 the circuit between the terminals 24 and 30 of the bridge network 18 is completed. During this time the voltage having the frequency of the oscillator 19 is inserted between the terminals 24 and 30 by the action of the transformer 38. One cycle of this voltage is indicated by the waveform 62 of Figure 3. During the positive portion of the waveform 62 sufficient circulatory current is drawn through the diodes to charge the condenser 58 to a level indicated by the dotted line 63. This, in effect, biases the diodes into a nonconducting condition for a greater portion of the cycle of the sampling wave provided by the oscillator 19. The conducting portion of the cycle, therefore, lies within the time interval defined by the dotted lines 64 and 65 of Figure 3.

When the diodes are conducting, it is possible for the burst of alternating current energy then present at the terminal 14 to appear at the terminal 16. One cycle of this waveform is indicated by the numeral 66 in Figure 3. During the positive portion of the waveform 66 that occurs during the conducting period of the diodes, that is during the nearly triangular portion indicated by the numeral 68, the condenser 15 is charged so that its top plate becomes positive with respect to ground. The charge path starts at ground, goes through the source of video signal 2, the diode 26, the terminals 30 and 24, the diode 22, the condenser 15 itself and back to ground. During the portion of the negative swings 69 of the waveform 66, the condenser 15 is charged in the opposite direction. Therefore, if the waveform 66 passes through a ground potential or reference potential midway through the conducting period defined by the dotted lines 64 and 65 of Figure 3, the condenser 15 is charged by a given amount and then discharged by the same amount. The net charge therefore on the condenser 15 is zero and the reactance tube 17, and hence the frequency of the oscillator 19, remains unchanged.

However, if the phase relationship between the burst of frequency as represented by the curve 66 and the oscillator frequency as represented by the waveform 62 should change, then either a positive or negative voltage is built across the storage condenser 15 and the reactance tube changes the frequency of the oscillator 19 as required.

An important feature of this invention is the fact that the application of the keying pulses 47 and 49 serve to make the bridge network 18 operative during the burst interval only.

Referring to Figure 4 there is shown a slightly different arrangement for applying the principles of this invention to a bridge network such as described in connection with Figure 1. For the sake of convenience those components that perform the same or similar functions in Figures 1 and 4 are indicated by the corresponding numerals. The difference lies in the details of the electronic switch employed to render the bridge circuit operable during the burst. The diodes 44 and 48 and the potentiometer 52 of Figure 1 are replaced by a series resistor 70. Negative pulses 47 are applied by a coupling condenser 46 to the lower end of the resistor 70 and positive pulses 49 are applied via the coupling condenser 46′ to the upper end of the resistor 70.

If the sum of the amplitudes of the pulses 47 and 49 is greater than the maximum possible difference between the video signal supplied by the source 2 and the sampling oscillator voltage wave introduced by the secondary 36, the bridge circuit operates as before. The reason for this requirement in the relative amplitudes of the pulses 47 and 49 is that these pulses largely determine the amount of charge on the condenser 58. If the charge in the condenser 58 is insufficient, the maximum swings of the video signals produced as a line is being scanned may be combined with the positive portion of the oscillator frequency appearing in the secondary 36 so as to provide a charge path for the condenser 15. Under certain circumstances this would produce an erroneous control voltage across the condenser 15, as it would be subject to the video signals derived from the image and appearing at the terminal 16. However, by increasing the amplitude of the pulses 47 and 49 the bias on the diodes can be made great enough so as to prevent the condenser 15 from being charged or discharged at any time except when these pulses occur or at any time except the burst interval.

The arrangement shown in Figure 5 illustrates another way in which the principles of this invention may be incorporated into a phase discriminator employing only 2 diodes. Such a phase discriminator will be found in Wendt Patent 2,250,284 noted above. A source of video signal 72 that is similar to the source 2 described in connection with Figures 1 and 4 and a storage condenser 74 that is to perform the same function as the storage condenser 15 of Figures 1 and 4 are connected in series between terminals 76 and 78. The voltage across the storage condenser 74 is employed, as is known to those skilled in the art, to control the conductivity of the reactance tube 80 which, in turn, controls the frequency of a sampling oscillator 82. Between the terminals 76 and 78 are connected charge and discharge paths for the condenser 74. The charge path is comprised of a unilateral conducting device such as a diode 84, an energy storage circuit 86 which may be comprised of a condenser and resistor connected in parallel, and a portion 88 of a secondary of a transformer 89 having its primary energized by the sampling frequency voltage wave supplied by the oscillator 82. Between the lower end of the secondary 88 and the terminal 78 there is connected a resistor 90.

The discharge path is comprised of a unilateral conducting device, which may be a diode 91, connected in series with an energy storage circuit 92, which may be comprised of a condenser and resistor connected in parallel. The upper end of the storage circuit 92 is connected via a portion 93 of the secondary of the transformer 89. Between the upper end of this portion of the secondary and the terminal 78 is connected a resistor 94. The diodes 84 and 91 are dissimilarly connected so that the cathode of the diode 84 is connected to the terminal 76 and the plate of the diode 91 is connected to the terminal 76. Positive pulses occurring during the burst interval are coupled to the upper end of the resistor 90 via the condenser 95, and similarly negative pulses are coupled to the lower end of the resistor 94 via a condenser 96.

The operation of the circuit arrangement shown in Figure 5 is as follows. Upon the occurrence of positive and negative pulses 97 and 99 across the series resistors 94 and 90, the diodes 84 and 91 conduct during a portion of each cycle of the voltage wave supplied by the oscillator 82 so that the upper plates of the condensers in the energy storage circuits 86 and 92 are charged negatively. This places a bias on the diodes 84 and 91 and prevents their conductance except during these pulse intervals when the bias is overcome. If the burst frequency of synchronizing wave is similar to that illustrated by the curve 66 shown by Figure 3, the condenser 74 charges in a positive direction during the positive portions of the burst and discharges in the negative direction during the negative portions of the burst. Thus, as in connection with Figures 1 and 4, the diodes 84 and 91 become conductive only during a small portion of a cycle of this frequency. During this conduction period, the burst of synchronous frequency that is applied by the source 72 to the terminal 76 is permitted to charge and discharge the storage condenser 74. Then, as was explained in connection with Figure 3, the phase relationship between this latter burst frequency and the period of conductivity or the phase relationship between this burst frequency and the frequency supplied by the oscillator 82 determines whether the charge condenser 74 is charged negatively or positively.

Having thus described my invention, what is claimed is:

1. Apparatus adapted to provide a frequency control voltage in response to the phase difference between a burst of synchronizing voltage and the output of an oscillator comprising in combination a first pair of diodes connected in series parallel with a second pair of diodes of like polarity, an energy storage circuit, the secondary winding of a transformer, an electronic switch adapted to supply pulses of such polarity as to urge said diode into a conducting condition, said energy storage circuit, said secondary winding and said switch being connected in series parallel relationship with said pairs of diodes, and said switch being adapted to operate only when said burst is present.

2. Apparatus as described in claim 1 in which a source of video signals is connected in series with a condenser across which the control voltage is to be developed, said series combination being connected between the junction between said first pair of diodes and the junction between said second pair of diodes.

3. Apparatus adapted to produce a frequency control voltage in response to the phase relationship between a burst of synchronizing alternating current and the output of an oscillator comprising the combination of a diode connected in series with a parallel combination of a resistor and a condenser, and in series with a portion of a transformer secondary, and in series with a resistor, a second diode having its plate tied to the cathode of the first diode, a parallel combination of a resistor and a condenser, another portion of said transformer secondary, and a resistor connected between the cathode of said second diode and said first mentioned resistor, a condenser and a source of video signals including said burst connected in series between the cathode of the first diode and the junction of said two resistors, and means for developing a pulse during said burst in response to a portion of said video signals, said latter means being connected in parallel with said resistors.

4. Apparatus for deriving a control voltage indicative of the amplitude and sense of the phase difference between two alternating current voltage waves, one of which occurs in bursts, the other being continuous comprising in combination, first and second terminals, a source of signals in which said bursts occur at predetermined intervals, a storage condenser coupled in series with said source, said series combination being connected between said terminals, a first unilateral current conducting device coupled between said terminals, a second unilateral current conducting device coupled between said terminals and in parallel with said first unilateral device, said first and second unilateral devices being connected so as to pass current in opposite directions between said terminals, means for biasing each of said unilateral current conducting devices to cut off, means for applying said continuous alternating waves in series with each of said unilateral devices, the amplitude of said waves being less than the cut-off bias applied to said unilateral current conducting devices, means for applying keying pulses in series with each of said unilateral devices, said keying pulses being of such polarity as to tend to overcome said cut-off bias applied to each of said unilateral current conduction devices, the amplitude of said keying pulses being such that when combined with the amplitude of said continuous wave, the cut-off bias applied to said unilateral current conducting devices is overcome for a portion of each cycle of said continuous alternating current wave occurring during said keying pulses thus permitting current to flow through one of said unilateral devices and charge said storage condenser in one polarity during a portion of the positive excursion of the alternating current wave occurring in bursts and to flow through the other unilateral current conducting device and charge said storage condenser in the opposite polarity during a portion of the negative excursions of the alternating current wave occurring in bursts so that the net charge on said condenser is dependent on the phase relationship between the alternating current waves occurring in bursts and the continuous alternating current waves.

MARSHALL M. CARPENTER, JR.

References Cited in the file of this patent

UNITED STATES PATENTS

| Number | Name | Date |
|---|---|---|
| 2,358,545 | Wendt | Sept. 19, 1944 |
| 2,532,338 | Schlesinger | Dec. 5, 1950 |
| 2,559,719 | Hershberger | July 10, 1951 |
| 2,588,094 | Eaton | Mar. 4, 1952 |